C. E. SCHWEISGOOD.
BELT FASTENER.
APPLICATION FILED JUNE 20, 1918.
1,313,642.
Patented Aug. 19, 1919.
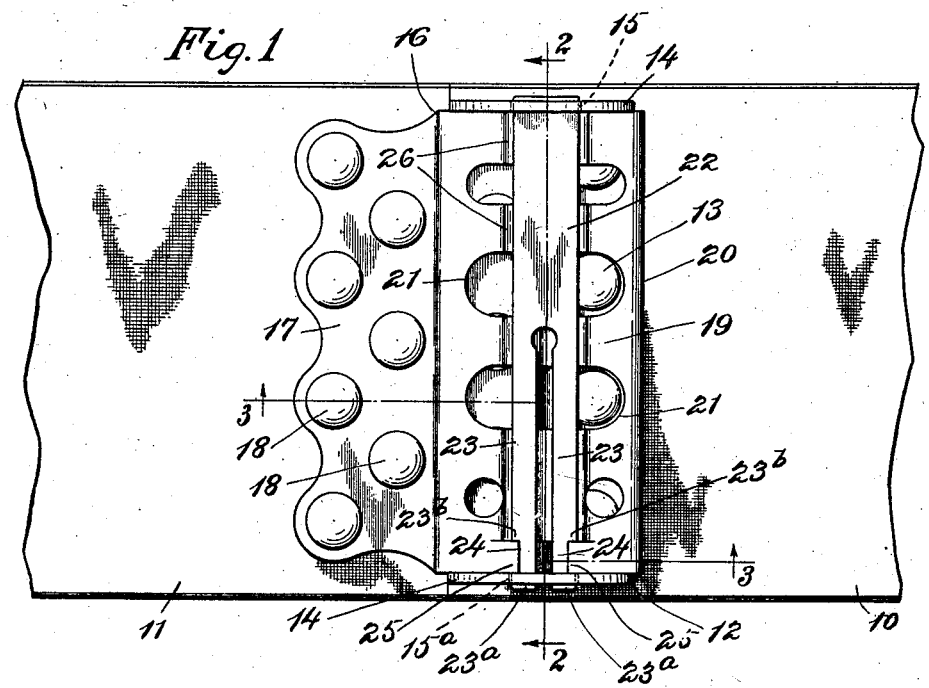
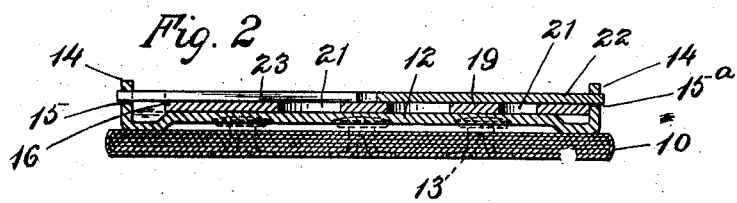
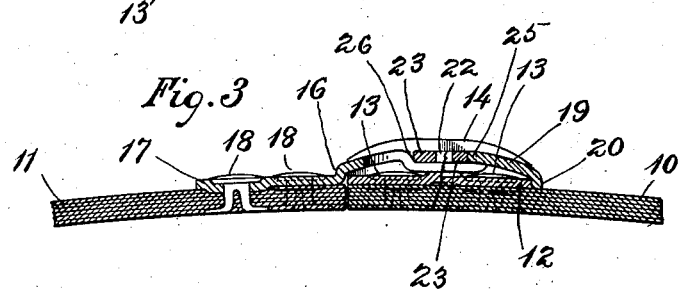
Inventor
C.E. Schweisgood
By Robert M. Pierson
Atty.

UNITED STATES PATENT OFFICE.

CHARLES E. SCHWEISGOOD, OF AKRON, OHIO, ASSIGNOR TO THE B. F. GOODRICH COMPANY, OF NEW YORK, N. Y., A CORPORATION OF NEW YORK.

BELT-FASTENER.

1,313,642.  Specification of Letters Patent.  Patented Aug. 19, 1919.

Application filed June 20, 1918. Serial No. 241,051.

*To all whom it may concern:*

Be it known that I, CHARLES E. SCHWEISGOOD, a citizen of the United States, residing at Akron, in the county of Summit and State of Ohio, have invented a certain new and useful Belt-Fastener, of which the following is a specification.

This invention relates to belt fasteners, and it has for its object to provide a separable fastener of simple but strong design which will securely connect the belt ends and may readily be coupled and uncoupled.

My invention may advantageously be used on belts for car-axle lighting systems, oil-well pumps, and in other situations where the belt requires rather frequent removal or renewal.

Of the accompanying drawings,

Figure 1 is a plan view showing my improved fastener applied to a belt.

Fig. 2 is a section on the line 2—2 of Fig. 1.

Fig. 3 is a section on the line 3—3 of Fig. 1.

In the drawings, 10, 11 are the two ends of an ordinary flat power belt. 12 is a keeper-plate forming one main member of the coupling or fastener and secured on the upper side of the belt-end 10 by means of pronged rivets 13. Ears 14 are turned up on the two ends or side edges of this plate, and said ears are formed with slots or apertures 15, 15$^a$ for the reception of the key-plate or retainer.

16 is a hook-plate constituting the other main member of the coupling, this plate being provided with an attaching portion 17 secured to the belt-end 11 by means of pronged rivets 18, and an upwardly-offset arched portion 19 which overlies the keeper-plate 12 between the ears 14 thereof and has a down-turned flange 20 hooking over the rear or remote edge of said keeper-plate. This overlying portion 19 is lightened with holes 21. Both plates are slightly curved longitudinally to approximate the curve of the belt when rounding the pulleys.

22 is a flat key or retaining bar overlying the hook-plate 17 and passed through the slots 15, 15$^a$ in the ears of the keeper-plate. The hook-plate 16 is grooved or depressed at 26 to receive said bar. The bar is longitudinally divided for about half its length to form a pair of spring arms 23, and said arms are notched or recessed at 24 on their outer edges, near one end, to receive a pair of horizontal lips 25 formed on the plate 16, the extremities 23$^a$ and the shoulders 23$^b$ of the spring arms hooking around the edges of these lips so as to lock the bar against displacement when the arms are in their normal positions. The particular form of and manner of mounting the retainer, as well as other features of construction, may be considerably varied without departing from my invention.

When the parts are assembled in their operative relation as shown in the drawings, the ends of the belt are securely coupled together, and the longitudinal separating strain is taken by the engagement of flange 20 on the hook-plate with the rear edge of the keeper-plate 12. As there is substantially no wear at this interlocked joint, there will be little or no tendency of the ends of the belt to draw apart when in use. As both members of the fastener are located on top of the belt, there will be no metal parts in contact with the pulleys if the prongs of the rivets 13 and 18 are clenched substantially flush with the belt surface as shown. To uncouple the fastener, the spring arms 23 are pressed together by hand or with any suitable tool to unlock them from the lips 25, and the retaining bar 22 is slid through the ears 14 from its operative position. The hook-plate 17 may then be disconnected from the keeper-plate 12 by a relative separating movement of the belt ends transverse to the plane of the belt. To re-couple the fastener, the foregoing operations are reversed as will be evident.

I claim:

1. In a belt fastener, the combination, with the belt, of a keeper-plate on one end, a hook-plate on the other end interlocked with said keeper-plate, and a withdrawable retainer interlocked with one of the plates, for maintaining said plates in interlocked relation.

2. In a belt fastener, the combination, with the belt, of a keeper-plate on one end, having upturned ears, a hook-plate on the other end interlocked with said keeper-plate and overlying the same between said ears, and a retainer overlying said hook-plate and engaging said ears.

3. In a belt fastener, the combination of a keeper-plate adapted for attachment to one end of the belt, a hook-plate adapted for attachment to the other end and interlocked with said keeper-plate, apertured ears on the keeper-plate, a retainer bar overlying the hook-plate and transversely slidable through the apertures in said ears, and means on said hook-plate interlocking with said bar for retaining the latter in position.

4. In a belt fastener, the combination of a keeper plate adapted for attachment to one end of the belt, a hook-plate adapted for attachment to the other end and interlocked with said keeper plate, and a sliding retainer bar for holding said plates in interlocked relation, said bar being formed with a pair of spring arms adapted to interlock the bar with one of said plates by their separating movement.

In testimony whereof I have hereunto set my hand this 18 day of June, 1918.

CHARLES E. SCHWEISGOOD.

Copies of this patent may be obtained for five cents each, by addressing the "Commissioner of Patents, Washington, D. C."